United States Patent [19]
Torok

[11] 3,794,341
[45] Feb. 26, 1974

[54] SNOW SLED AND THE LIKE

[76] Inventor: Robert Torok, 1116 W. Stewart Ave., Flint, Mich. 48504

[22] Filed: Jan. 31, 1972

[21] Appl. No.: 221,914

[52] U.S. Cl. ............................................. 280/21 R
[51] Int. Cl. ............................................ B62b 13/08
[58] Field of Search ..... 280/21 R, 16, 12 H, 12 KL, 280/12 B; 9/310 B

[56] References Cited
UNITED STATES PATENTS

| | | | |
|---|---|---|---|
| 3,591,193 | 7/1971 | Mitchell | 280/16 |
| 2,247,182 | 6/1941 | Bosca | 280/21 R |
| 3,092,857 | 6/1963 | Churchman | 9/310 B |
| 2,443,348 | 6/1948 | Flajole | 280/12 KL |
| 3,585,664 | 6/1971 | Thompson | 280/12 H |
| 3,380,090 | 4/1968 | Kenmuir | 9/310 B |

*Primary Examiner*—Robert R. Song
*Attorney, Agent, or Firm*—Andrew R. Basile

[57] ABSTRACT

A sled, particularly adapted for use over snow, having a disc-shaped platform with traction ribs disposed along the bottom surface thereof and an annular rim formed along the upper circular edge of the platform. A steering support member formed with the rim extends in a cantilever fashion outwardly from the platform in a plane which is elevated above the bottom surface of the disc-shaped platform. The outermost end of the steering support member has an upwardly flared section adapted to mount a cable to permit towing of the sled. The steering support member has a plurality of longitudinally spaced apertures which permit the mounting at selected locations along the length of the steering support member of a steering arm which, in turn, has mounted at its opposite ends elongated spherical steering elements which function to change the direction of the sled when the steering arm is rotated about its point of attachment to the steering support member. The sled is provided with a pair of support handles disposed on opposite sides of the rim and angularly spaced from the support member to provide the rider thereof with a means for supporting himself. In one embodiment, the sled is provided with integrally formed foot supports adapted to provide a means to enable a passenger to stand on the platform during forward motion thereof, while the steering arm is provided at its opposite ends with means for mounting a cable or the like to permit the passenger to steer the sled while the passenger stands.

9 Claims, 5 Drawing Figures

SNOW SLED AND THE LIKE

BACKGROUND OF THE INVENTION

1. Field of the Invention

The present invention relates to a passenger carrying vehicle which is adapted for slidable movement over snow, water, or ice and, in particular, the present invention relates to a new and improved passenger carrying snow sled.

2. Description of the Prior Art

Passenger carrying sleds and, particularly, those of the type adapted to move over snow are well known and generally comprise a platform having a pair of parallel, spaced runners which support the entire sled. At the forward end of the sled a suitable mechanism is provided for changing the direction of the forward ends of the runners with respect to the longitudinal axis of the sled thereby imparting a drag on the sled resulting in a change in direction. Although this type of construction provides for good steering characteristics, such sleds are heavy and expensive to manufacture.

More recently, commercially available sleds have been constructed of a simple concave-convex spherically-shaped or disc-shaped pan having a pair of diametrically opposed handles mounted at the upper edes of the disc-shaped member. The passenger normally sits within the disc-shaped member while the handles provide support for the passenger as the disc-shaped pan slides along the snow. Although this type of sled is lightweight in its construction, the sled provides no means for steering other than the shifting of the weight of the passenger and this method is ineffective in obtaining good steering control over the sled. Such previously used sleds adapted for use over snow have a number of other disadvantages which would be desirable to eliminate. In particular, the previously used sleds do not provide a simple means which permits an adjustment in the size of the sled to accomodate either an adult or a child. Many of the conventional rudder type sleds tend to bog down in heavy snow as the same are quite heavy in their construction and only ride on a relatively thin rudder. In addition, such previously used sleds cannot maneuver quickly when in motion and are apt to turn over if the passenger attempts to stand while controlling the direction of the sled.

SUMMARY OF THE INVENTION

The present invention which will be described subsequently in greater detail comprises a sled adapted to carry passengers and movable over water, snow or ice. The sled comprises a disc-shaped platform having a cantilevered steering support member onto which is adjustably mounted a steering mechanism adapted to steer the sled while the passenger is sitting or standing. Means are provided for attaching the sled to a vehicle for towing whether on water, snow or ice.

It is therefore an object of the present invention to provide a sled adaptable to carry passengers over water, snow, or ice and which is simple, lightweight and inexpensive in its construction.

It is also an object of the present invention to provide a sled which can be simply adjusted to accomodate either a child or an adult passenger and which has means to carry the passenger in a safe manner whether the passenger is standing or sitting during motion of the sled.

Other objects, advantages, and applications of the present invention will become apparent to those skilled in the art of sleds when the accompanying description of several examples of the present invention is read in conjunction with the accompanying drawings.

BRIEF DESCRIPTION OF THE DRAWINGS

The description herein makes reference to the accompanying drawings wherein like reference numerals refer to like parts throughout several views, and in which.

DESCRIPTION OF THE PREFERRED EMBODIMENTS

Figure 1:
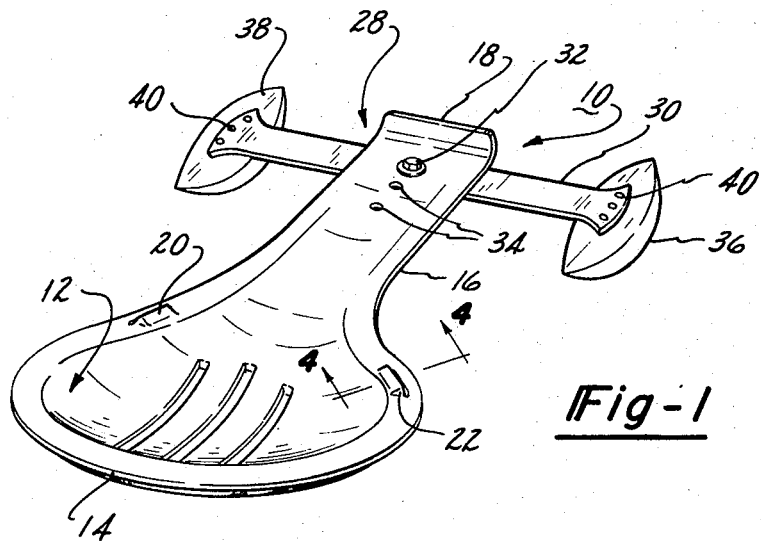
FIG. 1 is a perspective view of a sled constructed in accordance with the principles of the present invention.
Figure 2:
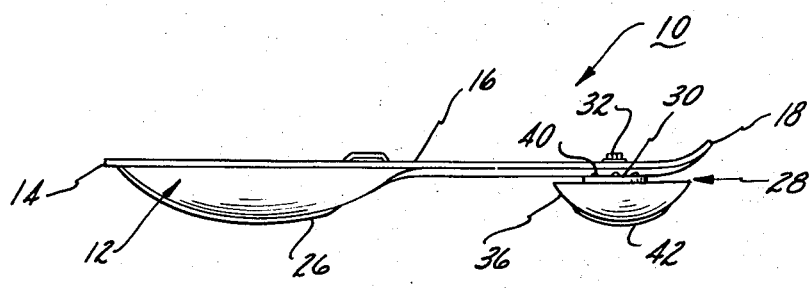
FIG. 2 is a side elevational view of the sled illustrated in FIG. 1.
Figure 3:
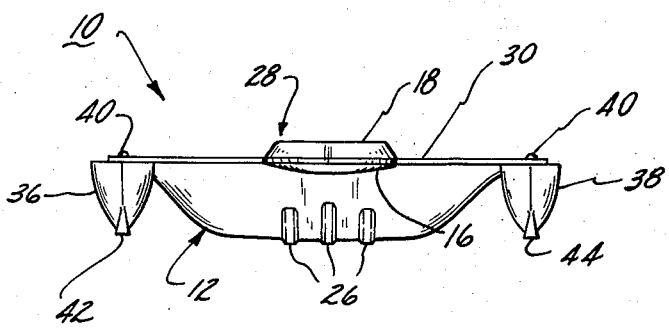
FIG. 3 is a front elevational view of the sled illustrated in FIG. 1.

Referring now to the drawings and, in particular, to FIGS. 1, 2 and 3 wherein there is illustrated one example of the present invention in the form of a sled 10, particularly adapted for slidable movement over snow, however, it is to be understood that the sled 10 may have equal application for movement over water or ice. The sled 10 comprises a body portion formed in a concave-convex disc-shaped platform 12, the disc-shaped interior of which is adapted to seat a passenger. The platform 12 has integrally formed along its upper edge an outwardly extending rim 14.

At the forward portion of the platform 12 there is integrally formed an outwardly extending steering support member 16, the outermost end 18 being flared upwardly to present a smooth, rounded outer contour in the event the forward end 18 of the support member 16 should engage the snow surface, and thus minimize the possibility of the sled end 18 digging into the snow and causing an abrupt stop of the sled 10. The support member 16 generally lies in the same plane as the rim 14, that is, the member 16 is elevated above the bottom of the disc-shaped platform 12, all of which will become more apparent hereinafter.

Figure 4:
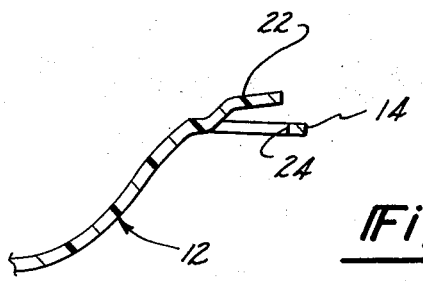
FIG. 4 is a fragmentary cross-sectional view of the sled taken along line 4—4 of FIG. 1.

As can best be seen in FIGS. 1 and 4, the rim 14 has a pair of handles 20 and 22 disposed on opposite side portions of the platform 12 at some angular spacing from the support member 16, their exact positioning being dependent upon the actual size of the sled 10. As can best be seen in FIG. 4, the handle 22 (or 20) is an integrally formed projection of the rim 14 which, in turn, has an aperture 24 immediately below the lower surface of the raised projection or handle 22 to accomodate the passenger's hand as he grasps the handle 22 for support. The rim 14, in addition to providing a convenient location for the handle 20 and 22, provides added strength and rigidity for the platform 12 and the steering support member 16.

Still referring to FIGS. 1, 2 and 3 the bottom or snow engaging surface of the disc-shaped platform 12 is slightly flatened to provide a large surface area such that the platform 12 will not bog down in heavy snow as in the case with more conventional rudder type sleds, as aforementioned. Near the mid-section of the bottom surface of the platform extending from front to rear, there is provided a plurality of spaced traction ribs 26 which aid in preventing the platform from sliding sideways while in motion, in addition, to aiding in providing good steering control of the sled 10.

The sled 10 is provided with a steering mechanism 28 comprising a steering arm 30 having an aperture (not shown) at its mid-section through which a fastening means 32 such as a threaded screw extending through any one of a plurality of longitudinally spaced apertures 34 in the support member 16 to mount the steering arm 30 for relative rotational movement about the axis of the fastening means 32, that is, the steering arm is normally mounted such that the longitudinal axis of the steering arm 30 is perpendicular to the longitudinal axis of the support member 16 when the sled 10 is moving along a straight course. A pair of elongated spherically shaped steering elements 36 and 38 are, respectively, fixedly attached to the outer extremeties of the steering arm 30 by any suitable means such as fastening screws 40.

As can best be seen in FIGS. 2 and 3, the bottom surfaces of the steering elements 36 and 38 have traction ribs 42 and 44, respectively, which are adapted to engage the snow and provide for better steering of the sled 10 when the steering arm is turned and the elongated axis of the steering elements 36 and 38 are inclined with respect to the longitudinal axis of the steering support member 16. For example, when the ribs 42 and 44, and thus the longitudinal axis of the elongaged steering elements 36 and 38 parallel the longitudinal axis of the support member 16, the sled will move in a generally straight direction. However, when the steering arm 30 is rotated about the longitudinal axis of the fastening means 32 in a counter-clockwise direction as viewed in FIG. 1, the longitudinal axis of the traction ribs 42 and 44, and thus the longitudinal axis of the steering elements 36 and 38, will be inclined with respect to the longitudinal axis of the support member and the vehicle will steer to the left. Conversely, when the steering arm 30 is rotated clockwise as viewed in FIG. 1, the axis of the steering elements 36 and 38 are inclined with respect to the support member 16 and the vehicle will steer to the right.

It can thus be seen that when a passenger is siting in the interior of the platform 12, with his hands grasping the handles 22 and 24, the passenger may extend his legs forwardly resting his feed upon the steering arm portions between the elements and the sides of the steering support member 16. By exerting a force with either leg on the steering arm 30, the same may be rotated in the desired direction to achieve the desired steering control.

It can also be seen that the apertures 34, spaced along the longitudinal length of the support member 16 permit the mounting of the steering arm 30 at any selected distance from the platform 12 whereby passengers such as an adult or a child may be simply accomodated by positioning the steering mechanism 28 at a distance which is most convenient from the passenger. For example, an adult would normally have the steering mechanism 28 mounted at the furthermost out aperture 34, while a child would have the steering mechanism 28 mounted at an aperture more closely spaced to the platform 12. In the preferred embodiment the platform 12 has an approximate diameter of 2 feet while the overall length of the sled is approximately 4 feet. The width of the support member 16 is approximately 8 inches. The width of each steering element 36 and 38 is 9 inches. The steering elements have an overall length of 18 inches, while the steering arm 30 measures 2 feet in length.

Figure 5:
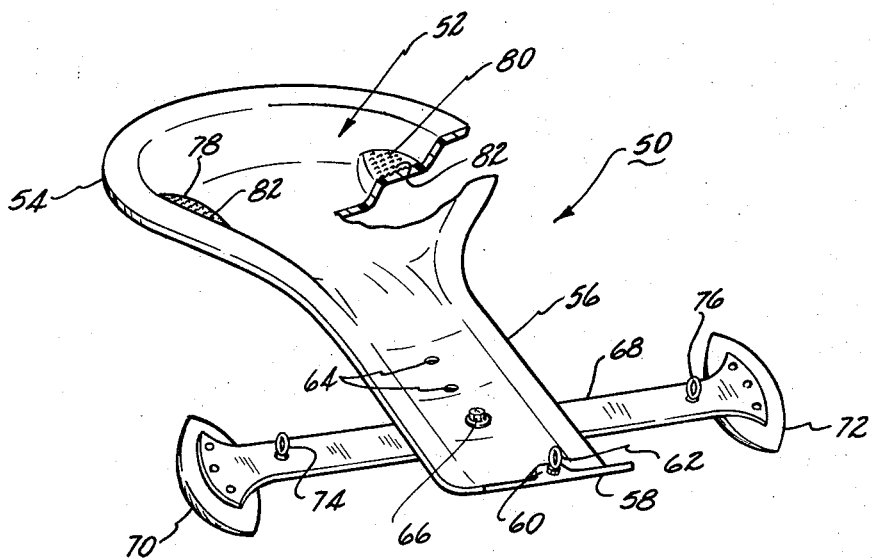
FIG. 5 is a partially sectioned perspective view of a modification of the sled illustrated in FIG. 1.

Referring now to FIG. 5, wherein there is illustrated a second embodiment of the present invention in the form of a snow sled 50 having a disc-shaped platform 52 with an outer peripheral rim 54 extending along the upper edges of the disc 52 and integrally formed therewith in the same manner as described with respect to the snow sled 10. The platform 52 has an integrally formed, outwardly extending steering support member 56, the outer end 58 of which is flared upwardly and is provided with an enlarged midsection 60 onto which an anchor 62 is fastened by any suitable means such as a nut engaging a threaded end of the anchor 62. The anchor 62 is adapted to be fastened to a cable or the like which, in turn would be attached to a vehicle, such as a snowmobile, to permit towing of the snow sled 50. The support member 56 is further provided with a plurality of axially spaced apertures 64 which accomodate fastening means 66 for attaching a steering arm 68 thereto in such a manner that the steering arm 68 is adapted for rotational movement about an axis perpendicular to the longitudinal axis of the support member 56 in the same manner as hereinbefore described with respect to the sled 10. The outer extremeties of the steering arm 68 each have steering elements 70 and 72 which are of a construction similar to the steering elements 36 and 38 in that they are provided with traction ribs (not shown) on the undersides thereof. The steering arm 68 is provided with anchors 74 and 76, respectively, approximate the elements 70 and 72 and are adapted to be fastened to the arm 68 by any suitable means such as a nut engaging a threaded end formed on the anchors. The anchors 74 and 76 are adapted to have a cable or the like fastened thereto and of a length sufficient for the passenger sitting on the platform 52 to grasp the same and exert a rotational movement on the arm 68 to steer the sled 50 in the desired direction. In addition, the platform 52 has on the interior or upper surface thereof diametrically opposed horizontally disposed steps 78 and 80 which are integrally formed with the platform 52 and adapted to provide support for the passenger's feet when standing and employing the steering cables to steer the snow sled 50 when the same is in motion. The steps 78 and 80 are provided with grooved upper surfaces 82 which generate a certain amount of friction to prevent the passenger from slipping while he is standing on the steps 78 and 80 and the sled is in motion. It should be understood by those skilled in the art of fabricating sleds that although not shown in the accompanying drawing, the embodiment of the sled 50 illustrated in FIG. 5 may also be fabricated with the handles 20 and 22 and with the space traction ribs 26.

It can thus be seen that the present invention provides a sled in which the passenger may either sit or stand upon while riding and in which the passenger may steer in any desired direction. It can also be seen that the present invention provides a sled that may be towed while still permitting a limited independent amount of steering ability on the part of the passenger.

It can also be seen that the present invention can be fabricated from a plastic or comparable moldable material by any suitable conventional manufacturing technique and in a very inexpensive manner while providing a sled that is of a lightweight construction, safe to use and one which will travel faster and further than conventional sleds while the passenger has greater steering control over the same.

It can also be seen that since a very large surface area is exposed to the snow it is highly unlikely that the sled will bog down in deep snow and will not overturn as in the case in the aforementioned conventional type sleds in which rudders are utilized for support of the sled.

It can also be seen that the means for permitting the selected positioning of the steering arm along the longitudinal axis of the support member provides a sled which is adapted for use by either adults or children and one which can be simply adjusted to accommodate such persons.

Although only two forms of the present invention have been disclosed, it should be understood by those skilled in the art of snow sleds or the like that other forms may be had or coming within the spirit of the invention and the scope of the appended claims.

I claim:

1. A sled adapted to carry at least one passenger, said sled comprising a circular disc-shaped platform, the bottom wall of which provides support for said passenger, said platform having a laterally disposed annular reinforcing rim integrally formed with and extending outwardly from the upper edge of said disc-shaped platform;

said bottom wall being a substantially rounded section extending downwardly from said annular rim and said bottom wall adapted to slidably engage the ground on which said slide is carried;

a steering support member formed integrally with said disc-shaped platform and extending in a cantilever fashion outwardly from said rim, said support member lying in a plane which is in the same plane as said rim and elevated relative to the ground engaging surface of said disc-shaped platform bottom wall;

the extended end of said support member terminating in an upwardly flared end section;

a steering arm comprising an elongated flat member;

means for pivotally mounting said the upper surface of said steering arm at its mid-section to the lower surface of said support member such that said steering arm is movable in a horizontal plane;

a pair of elongated steering elements fixedly mounted, respectively, to opposite ends of said steering arm with the longitudinal axis of said steering elements being perpendicular to the longitudinal axis of said steering arm;

the extended portion of said support member being supported in a horizontal position only by said steering arm and said steering elements.

2. The sled defined in claim 1 wherein said platform and said support member are fabricated from a lightweight material, such as plastic.

3. The sled defined in claim 1 further comprising at least one traction rib formed on the bottom surface of said disc-shaped platform and extending in a direction parallel to said steering support member.

4. The sled defined in claim 1 wherein said platform has a pair of support handles mounted proximate said rim and angularly spaced from said steering support member on the opposite side thereof.

5. The sled defined in claim 1 wherein said steering arm and said steering support member have cooperating means which permit the mounting of said steering arm at selected locations along the longitudinal length of said steering support member.

6. The sled defined in claim 1 further comprising means for mounting a tow line to the outermost end of said steering support member to permit towing of said sled.

7. The sled defined in claim 1 further comprising support means on said disc-shaped platform for permitting said passenger of said sled to stand, said support means being laterally spaced integrally formed horizontal members extending inwardly from the sides of said disc-shaped platform a distance approximately equal to the width of a foot and downwardly beyond this point for integral connection with said bottom wall to provide vertical support for said horizontal member; and means mounted near the outer extremeties of said steering arm to permit said passenger to steer said sled while standing.

8. The sled defined in claim 1 wherein said steering members have on the bottom surfaces thereof traction ribs extending in a direction paralleling the longitudinal axis of said steering members.

9. The sled defined in claim 7 wherein said platform has a pair of integrally formed support handles mounted on said rim and angularly spaced a distance less than 90° from the opposite sides of said steering support member.

* * * * *